(12) United States Patent
Atokawa et al.

(10) Patent No.: US 6,288,620 B1
(45) Date of Patent: Sep. 11, 2001

(54) ANTENNA-DUPLEXER AND COMMUNICATION APPARATUS

(75) Inventors: Masayuki Atokawa; Yasuo Yamada, both of Kanazawa; Kikuo Tsunoda, Ishikawa-ken, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/324,143

(22) Filed: Jun. 2, 1999

(30) Foreign Application Priority Data

Jun. 2, 1998 (JP) .................................................. 10-153058
Apr. 23, 1999 (JP) .................................................. 11-117255

(51) Int. Cl.[7] .............................. H01P 1/10; H01P 5/12; H04B 1/46; H04B 1/44
(52) U.S. Cl. .......................... 333/103; 333/126; 455/82; 455/83
(58) Field of Search .................................... 333/101, 103, 333/104, 126, 129, 132, 134; 455/78–83

(56) References Cited

U.S. PATENT DOCUMENTS 5,227,748  7/1993  Sroka ................................... 333/207
5,594,394 * 1/1997  Saski et al. ........................... 333/103
6,085,071 * 7/2000  Yamada et al. ........................ 455/82

FOREIGN PATENT DOCUMENTS 7321509  12/1995  (JP) .

* cited by examiner

Primary Examiner—Robert Pascal
Assistant Examiner—Kimberly E Glenn
(74) Attorney, Agent, or Firm—Ostrolenk, Faber, Gerb & Soffen, LLP

(57) ABSTRACT

An antenna-duplexer and communication apparatus in which relative phase distortion of transmitted waves and intrusive waves is low, and which are small-scale. An antenna-duplexer comprises a transmission side circuit, electrically connected between a transmission terminal and an antenna terminal, and a reception side circuit, electrically connected between a reception terminal and the antenna terminal. Two PIN diodes, which are connected in series, are connected only to a resonator of the transmission side circuit which is electrically connected closest to the antenna terminal, and a voltage control terminal is connected to the anodes of the PIN diodes, thereby dividing the high-frequency voltage. One PIN diode is connected to each of the other resonators.

20 Claims, 8 Drawing Sheets

ANTENNA-DUPLEXER AND COMMUNICATION APPARATUS

BACKGROUND OF THE INVENTION

1. Field of the Invention

The present invention relates to an antenna-duplexer and a communication apparatus, used for instance at the microwave band.

2. Description of the Related Art

There is a frequency-variable antenna-duplexer in which an impedance element (switching element), such as a PIN diode or a variable-capacity diode, is connected to a resonator via a capacitor or the like, and the resonant frequency is varied by voltage-controlling these elements. (See for instance Japanese Unexamined Patent Publication No. 7-321509) When a PIN diode is used, the frequency can be switched ON and OFF so that there are two bands, one band during ON and another during OFF. Usually, a positive control voltage is applied to switch the PIN diode ON, and a negative voltage is applied to switch it OFF. A negative voltage is needed for switching OFF because when a high-frequency signal of large electrical power is input, a high-frequency voltage is applied to the PIN diode, thereby switching it ON; a negative voltage avoids this. That is, a negative voltage is needed to prevent the pin diode from becoming unstable when a large power is input, resulting in fluctuating frequency characteristics.

In the above described frequency-variable antenna-duplexer, the impedance element, such as a PIN diode, is nonlinear, and consequently when an unwanted electromagnetic wave enters from the antenna terminal during transmission, the transmission wave F1 and the intrusive wave F2 suffer relative modulation. As a result, a spurious signal F3 (2F1–F2) is generated. Depending on the frequency of the intrusive wave F2, the spurious signal F3 may be the same as the reception frequency. Therefore, in an antenna-duplexer, such relative modulation distortion needs to be reduced as much as possible. This relative modulation distortion occurs when the impedance element has been switched OFF by applying a negative voltage to it.

One method of countering this problem is to increase the negative voltage to stabilize the diode. However, this requires a circuit to generate the large negative voltage, and consequently the communication apparatus cannot be made small-scale. Furthermore, in a third embodiment disclosed in Japanese Unexamined Patent Publication No. 7-321509, two diodes are used for the resonator circuit, instead of generating a large negative voltage. However, since two diodes must be used for all every resonator circuit, there is a problem that an antenna with multiple resonator circuits will be extremely large, making this method inefficient.

SUMMARY OF THE INVENTION

To overcome the above described problems, preferred embodiments of the present invention provide an antenna-duplexer and a communication apparatus which have low relative modulation distortion of transmitted waves and intrusive waves, and in addition, are small-scale.

One preferred embodiment of the present invention provides an antenna-duplexer, comprising:

- a transmission terminal, a reception terminal and an antenna terminal;
- a transmission side circuit, electrically connected between said transmission terminal and said antenna terminal, and comprising at least one first resonator and a first voltage-controllable impedance element which is electrically connected between said first-resonator and ground via either a first inductance or a first capacitor; and
- a reception side circuit, electrically connected between said reception terminal and said antenna terminal, and comprising at least one second resonator and a second voltage-controllable impedance element which is electrically connected between said second resonator and ground via either a second inductance or a second capacitor;
- a plurality of said first impedance elements being connected in series to said first resonator of said transmission side circuit which is electrically connected closest to said antenna terminal.

Here, PIN diodes, variable-capacitance diodes or field effect transistors are used as the first impedance elements.

With the above constitution, high-frequency voltage can be divided by multiple in-series first impedance elements, connected to the first resonator of the transmission side circuit which is electrically connected closest to the antenna terminal, making it possible to effectively reduce the relative modulation distortion of the transmission waves and intrusive waves, entering from the antenna terminal.

Furthermore, a communication apparatus according to the present invention comprises any one of the antenna-duplexers having the characteristics described above, whereby relative modulation distortion of the transmission waves and intrusive waves from the antenna terminal can be reduced. Thus, the electrical characteristics of the communication apparatus can be improved.

Other features and advantages of the present invention will become apparent from the following description of preferred embodiments of the invention which refers to the accompanying drawings, wherein like reference numerals indicate like elements to avoid duplicative description.

DESCRIPTION OF THE PREFERRED EMBODIMENTS

Figure 1:
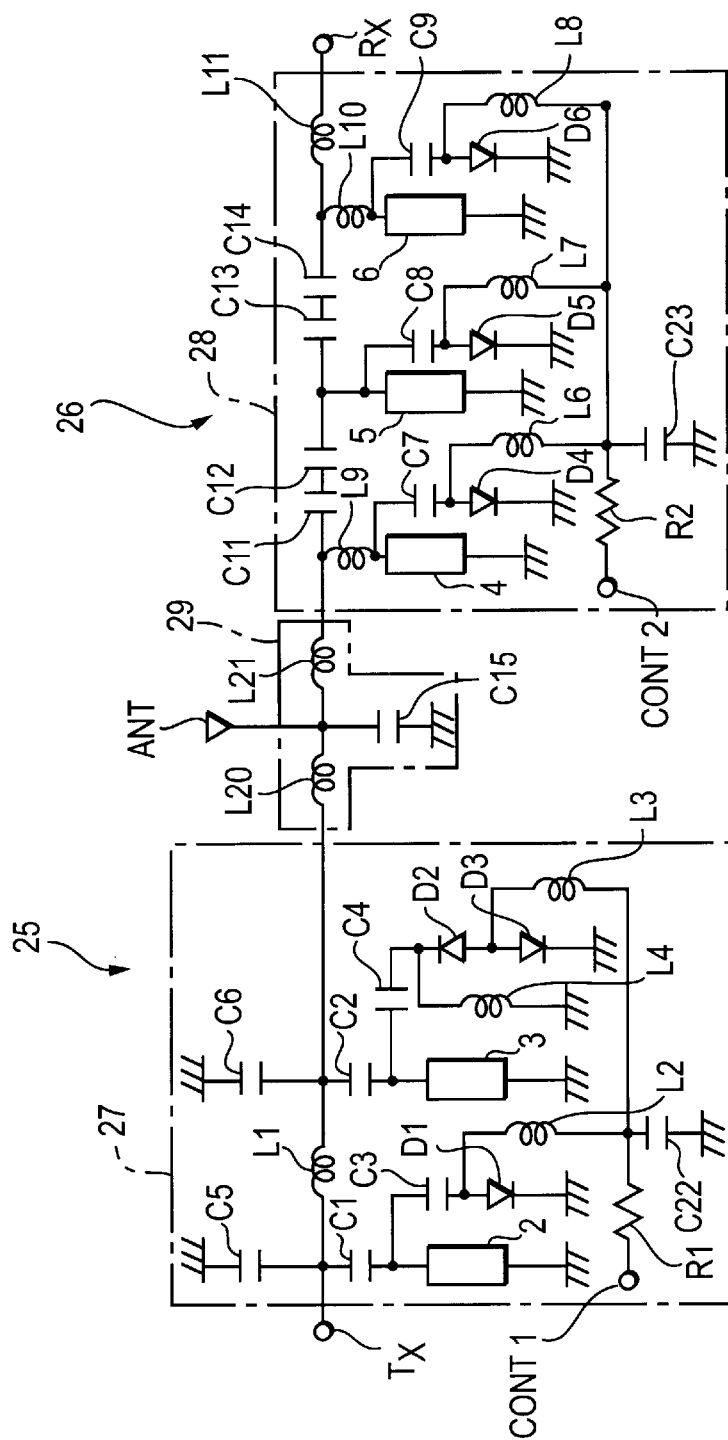
FIG. 1 is an electrical circuit diagram showing a first preferred embodiment of an antenna-duplexer according to the present invention.

Referring to FIG. 1, An antenna-duplexer 1 comprises a transmission side circuit 25, electrically connected between a transmission terminal Tx and an antenna terminal ANT, and a reception side circuit 26, electrically connected between a reception terminal Tx and the antenna terminal ANT.

The transmission side circuit 25 has a frequency-variable band-stop filter 27 and a phase circuit 29. The band-stop filter 27 is formed by coupling two resonators, and comprises a resonator 2, electrically connected via a capacitor for resonating C1 to the transmission terminal Tx, and a resonator 3, electrically connected via a capacitor for resonating C2 to the phase circuit 29. The capacitors for resonating C1 and C2 determine the size of attenuation in the stop regions. The series-resonant circuit, which comprises the resonator 2 and the capacitor for resonating C1, is electrically connected to the series-resonant circuit, which comprises the resonator 3 and the capacitor for resonating C2, by a coil L1 for coupling. Furthermore, capacitors C5 and C6 are electrically connected in parallel to these two series-resonant circuits respectively.

At a connection point midway between the resonator 2 and the capacitor for resonating C1, an impedance element comprising a PIN diode D1, the cathode of which is grounded, is electrically connected in parallel with the resonator 2 via a capacitor for varying band C3. Similarly, at a connection point midway between the resonator 3 and the capacitor for resonating C2, two PIN diodes D2 and D3 connected in series are electrically connected in parallel with the resonator 3 via a capacitor for varying band C4. The cathode and anode of the PIN diode D2 are electrically connected to the anodes of the capacitor for varying band C4 and the PIN diode D3 respectively, and the cathode of the PIN diode D3 is grounded. The capacitors for varying band C3 and C4 are for changing two attenuation extreme frequencies of the attenuation characteristics of the frequency-variable band-stop filter 27. Furthermore, to ensure that dc current flows when the PIN diodes D1 and D2 are ON, a choke coil L4 is provided between the cathode of the PIN diode D2 and ground.

A voltage control terminal CONT1 comprises a resistor for control voltage supply R1 and a capacitor C22, which are electrically connected via a choke coil L2 to a connection point midway between the anode of the PIN diode D1 and the capacitor for varying band C3, and in addition, the resistor for control voltage supply R1 and the capacitor C22 are electrically connected via a choke coil L3 at a connection point midway between the anodes of the PIN diodes D2 and D3.

The phase circuit 29 is a T-shaped circuit comprising a coil L20, electrically connected between the band-stop filter 27 and the antenna terminal ANT, a capacitor C15, electrically connected between ground and the antenna terminal ANT, and a coil L21, electrically connected between a band-pass filter 28 (explained later) of the reception side circuit 26 and the antenna terminal ANT.

On the other hand, the reception side circuit 26 comprises a frequency variable band-pass filter 28 and the phase circuit 29. In the first embodiment, the reception side circuit 26 shares the phase circuit 29 with the transmission side circuit 25, but of course the transmission side circuit 25 and the reception side circuit 26 may have their own independent phase circuits.

The band-pass filter 28 is formed by coupling resonator circuits in three stages, and comprises a resonator 4, electrically connected via an inductance for resonating L9 to the phase circuit 29, a resonator 6, electrically connected via an inductance for resonating L10 to the reception terminal Rx, and a resonator 5, electrically connected via coupling capacitors C11, C12, C13 and C14 midway between the resonators 4 and 6.

At a connection point midway between the resonator 4 and the inductance for resonating L9, a circuit comprising a capacitor for varying band C7 and a PIN diode D4 connected in series, the cathode of the PIN diode D4 being grounded, is electrically connected in parallel with the resonator 4. At a connection point midway between a resonator 5 and coupling capacitors C12 and C13, a circuit comprising a capacitor for varying band C8 and a PIN diode D5 connected in series, the cathode of the PIN diode D5 being grounded, is electrically connected in parallel with the resonator 5. At a connection point midway between a resonator 6 and an inductance for resonating L10, a circuit comprising a capacitor for varying band C9 and a PIN diode D6 connected in series, the cathode of the PIN diode D6 being grounded, is electrically connected in parallel with the resonator 6.

A voltage control terminal CONT2 comprises a resistor for control voltage supply R2 and a capacitor C23, which are electrically connected via a choke coil L6 to a connection point midway between the anode of the PIN diode D4 and the capacitor for varying band C7, a resistor for control voltage supply R2 and a capacitor C23, which are electrically connected via a choke coil L7 to a connection point midway between the anode of the PIN diode D5 and the capacitor for varying band C8, and in addition, a resistor for control voltage supply R2 and the capacitor C23, which are electrically connected via a choke coil L8 at a connection point midway between the anode of the PIN diodes D6 and a capacitor for varying band C9.

Figure 2:
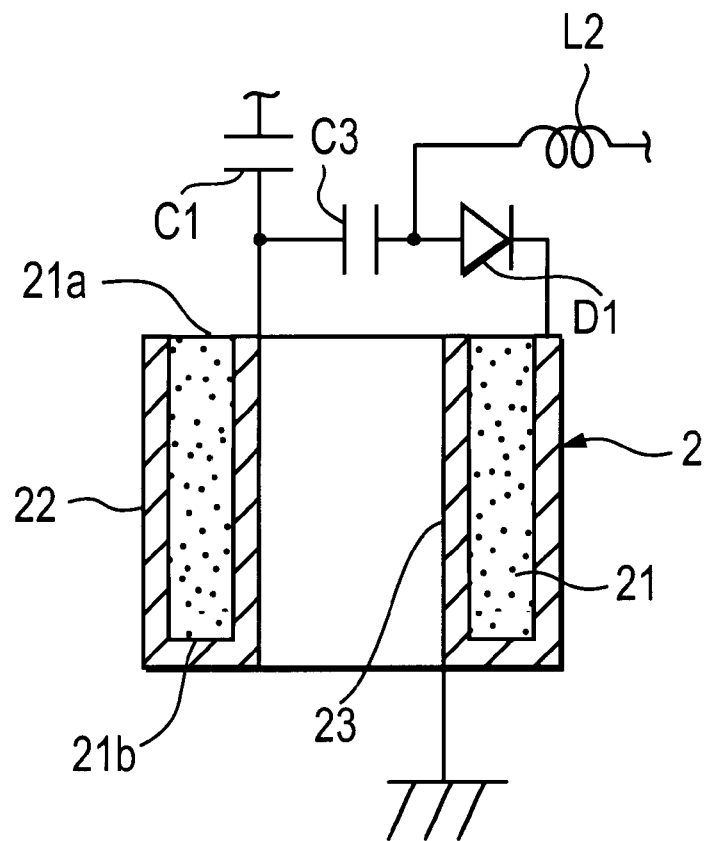
FIG. 2 is a cross-sectional view of an example of a resonator used in the antenna-duplexer shown in FIG. 1.
Figure 3:
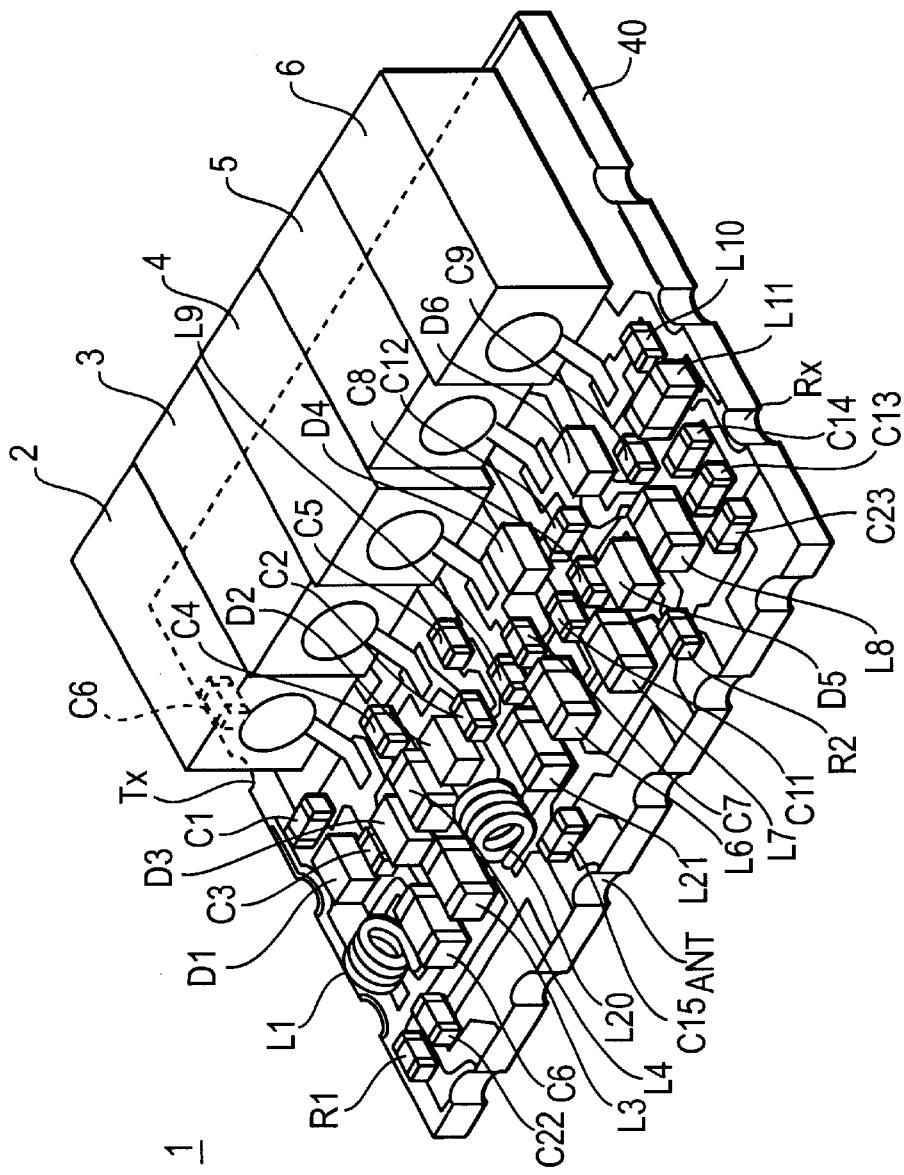
FIG. 3 is a perspective view of an mounted structure of the antenna duplexer shown in FIG. 1.

Dielectric resonators, such as for instance the one shown in FIG. 2, are used as the resonators 2–6. FIG. 2 shows the resonator 2 a representative example. Each of the resonators 2–6 comprises a cylindrical dielectric 21, comprising a material of high dielectric constant such as a $TiO_2$ ceramic, an external conductor 22, provided around the outer rim face of the cylindrical dielectric 21, and an internal conductor 23, provided around the inner rim face of the cylindrical dielectric 21. The external conductor 22 is electrically released (separated) from the internal conductor 23 at one open end face 21a (hereinafter open side end face 21a) of the dielectric 21, and is electrically short-circuited (conducted) to the internal conductor 23 at the other open end face 21b (hereinafter side end face 21b). An in-series circuit comprising the capacitor for varying band C3 and the PIN diode D1 is electrically connected at the open side end face 21a of the dielectric resonator 2, with one end of the capacitor for varying band C3 connecting to the internal conductor 23, and the cathode of the PIN diode D1 connecting to the external conductor 22, and the external conductor 22 is grounded at the side end face 21b. FIG. 3 is a perspective view of the antenna-duplexer 1 when all components have been mounted on a circuit board 40.

Next, the operation and effects of the antenna-duplexer 1 of the above constitution will be explained. In the antenna-duplexer 1, transmission signals sent from a transmission circuit system to the transmission terminal Tx pass through the transmission side circuit 25 and are output from the antenna terminal ANT. In addition, receive signals enter the antenna terminal ANT, pass through the reception side circuit 26 and are output to a receive circuit system from the reception terminal Rx.

The trap frequency of the band-stop filter 27 of the transmission side circuit 25 is determined by the resonant frequencies of the resonating system comprising the capacitor for varying band C3, the capacitor for resonating C1 and the resonator 2, and the resonating system comprising the capacitor for varying band C4, the capacitor for resonating C2 and the resonator 3. Then, when a positive voltage is applied to the voltage control terminal CONT1 as a control voltage, the PIN diodes D1, D2 and D3 are turned ON. Consequently, the capacitors for varying band C3 and C4 are grounded via each of the PIN diodes D1, D2 and D3, both the attenuation extreme frequencies are lowered, and the pass band of the transmission side circuit 25 is low.

Conversely, when a negative voltage is applied to the voltage control terminal CONT1 as a control voltage, the PIN diodes D1, D2 and D3 are turned OFF. As a consequence, the capacitors for varying band C3 and C4 are released, the two attenuation extreme frequencies are raised, and the pass band of the transmission side circuit 25 is higher. Thus, by using voltage control to ground and release the capacitors for varying band C3 and C4, the transmission side circuit 25 can be given two different pass band characteristics.

On the other hand, the pass frequency of the band-pass filter 28 of the reception side circuit 26 is determined by the resonant frequencies of the resonating system comprising the capacitor for varying band C7, the inductance for resonating L9 and the resonator 4, the resonating system comprising the capacitor for varying band C8 and the resonator 5, and the resonating system comprising the capacitor for resonating C9, the inductance for resonating L10 and the resonator 6. Then, when a positive voltage is applied to the voltage-control terminal CONT2 as a control voltage, the PIN diodes D4, D5 and D6 are turned ON. Consequently, the capacitors for varying band C7, C8 and C9 are grounded via each of the PIN diodes D4, D5 and D6, lowering the pass frequency. Conversely, when a negative voltage is applied as the control voltage, the PIN diodes D4, D5 and D6 are turned OFF. As a consequence, the capacitors for varying band C7, C8 and C9 are released, raising the pass frequency. Thus, by using voltage control to ground and release the capacitors for varying band C7–C9, the reception side circuit 26 can be given two different pass band characteristics.

The frequency-variable band-pass filter 28 is voltage-controlled in correspondence with the switching between the two high and low pass bands of the transmission side circuit 25, so that when a low-frequency pass band has been selected as the transmission band; the bandpass frequency is lowered, and when a high-frequency pass band has been selected as the transmission band, the bandpass frequency is raised. Consequently, phase synthesis with the transmission side circuit 25 is ideally achieved.

Furthermore, in the antenna-duplexer 1, the two PIN diodes D2 and D3, which are connected in series, are connected only to the resonator 3 of the transmission side circuit 25, this being the resonator which is electrically connected closest to the antenna terminal ANT, and the voltage control terminal CONT1 is connected to the anodes of the PIN diodes D2 and D3, thereby dividing the high-frequency voltage. As a result, it is possible to effectively eliminate the relative modulation distortion wave F3, produced by the transmission wave F1 and an intrusive wave F2, which enters from the antenna terminal ANT. This is because the relative modulation distortion wave F3, produced by the transmission wave F1 and an intrusive wave F2, which enters from the antenna terminal ANT, is most effectively reduced by reducing nonlinear distortion of the voltage-controllable impedance element connected to the resonator of the multiple resonators 2 and 3 of the transmission side circuit 25 which is closest to the antenna terminal ANT, that is, the resonator 3.

Figure 4:
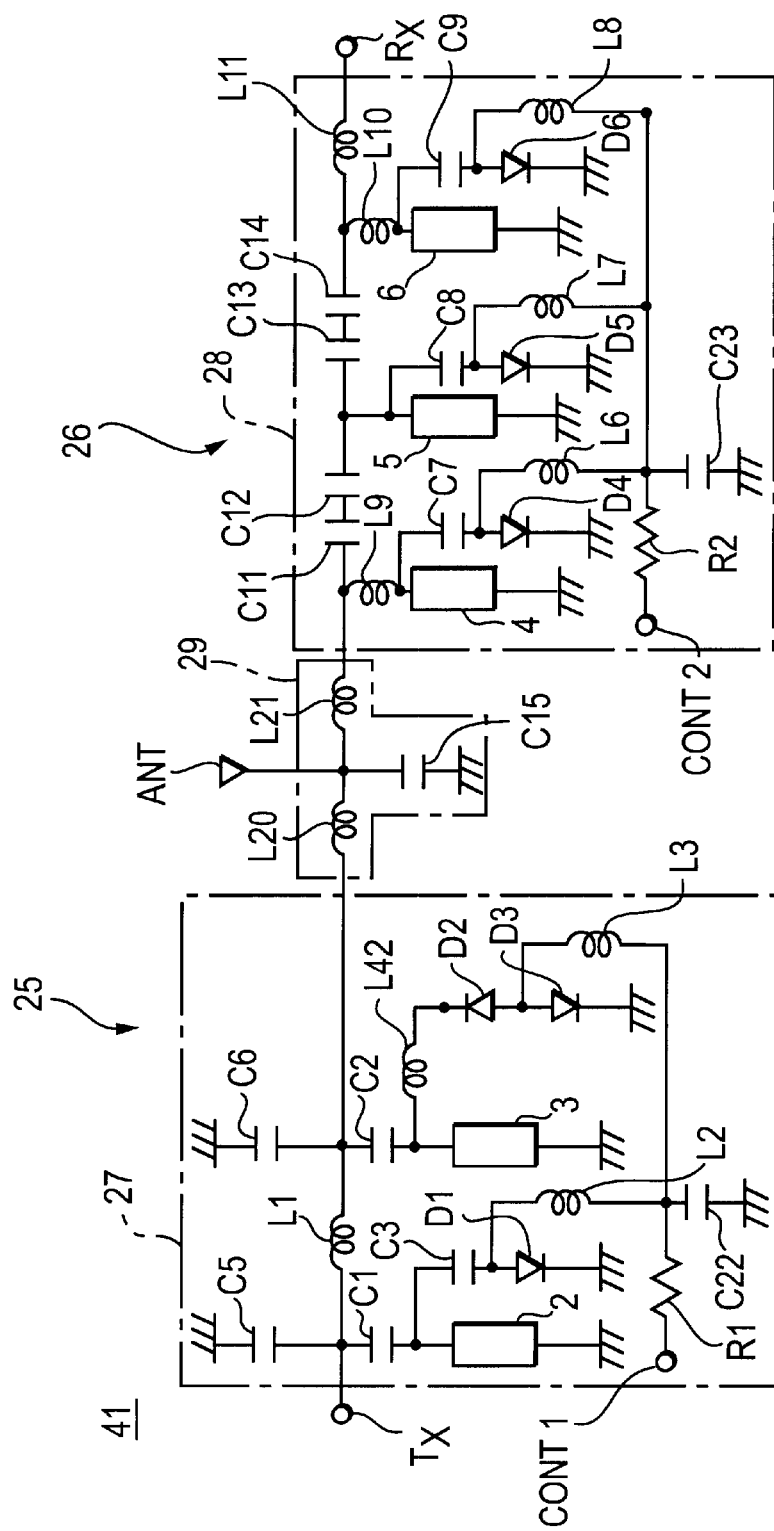
FIG. 4 is an electrical circuit diagram showing a second preferred embodiment of an antenna-duplexer according to the present invention.

FIG. 4 shows an electrical circuit of a second preferred embodiment of the antenna-duplexer according to the present invention. The antenna-duplexer 41 uses an inductance L42 instead of the capacitor for varying band C4, but is otherwise the same as the antenna-duplexer 1 of the first embodiment. By using the inductance L42, the choke coil L4 of the antenna-duplexer 1 is no longer needed, making it possible to reduce the number of components.

Figure 5:
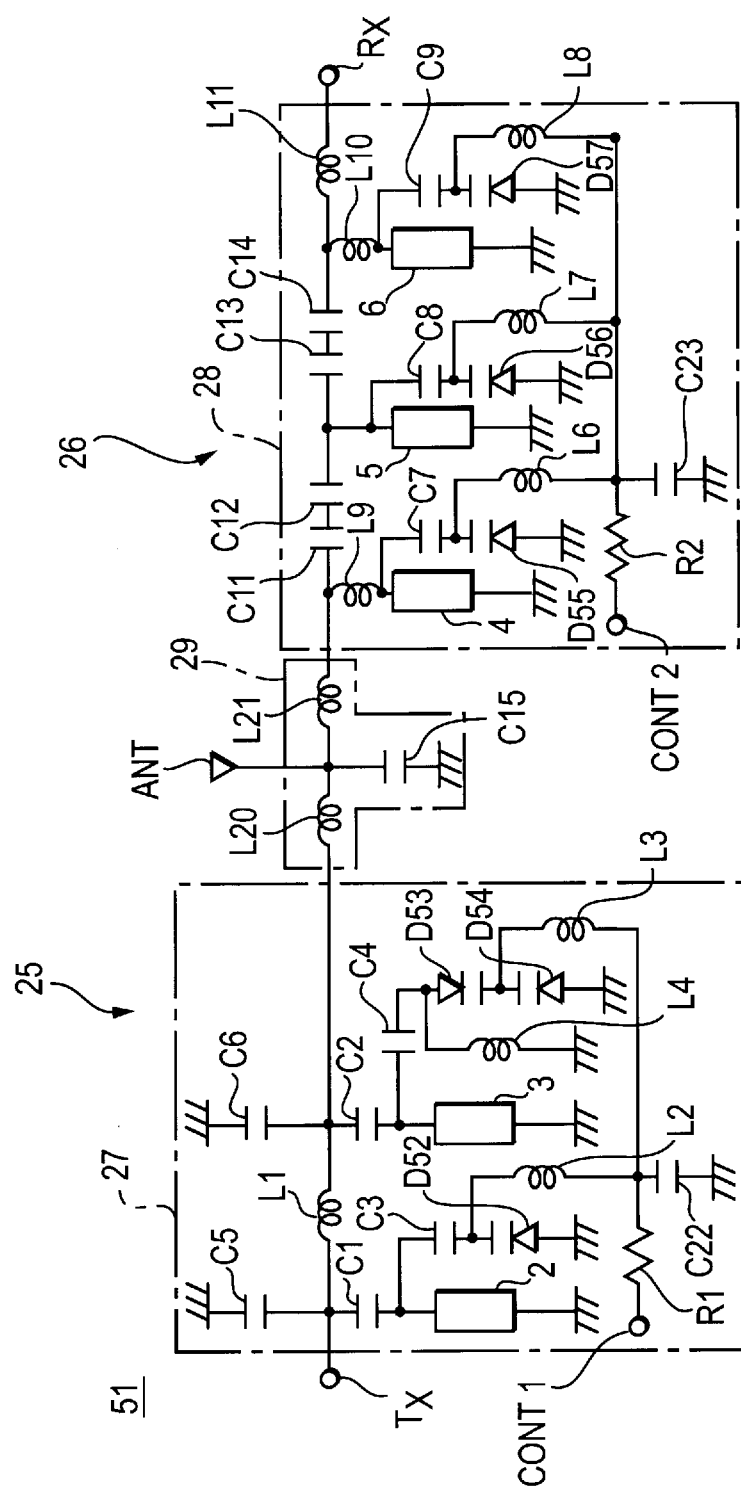
FIG. 5 is an electrical circuit diagram showing a third preferred embodiment of an antenna-duplexer according to the present invention.

FIG. 5 shows an electrical circuit of a third preferred embodiment of the antenna-duplexer according to the present invention. The antenna-duplexer 51 uses variable-capacitance diodes D52–D57 as its voltage-controllable impedance elements. The variable-capacitance diodes D52, D55, D56 and D57 are electrically connected via the capacitors for varying band C3, C7, C8 and C9 respectively to the resonators 2, 4, 5 and 6, the anodes of the variable-capacitance diodes D52–D57 being grounded.

The variable-capacitance diodes D53 and D54 are connected in series, the anode and cathode of the variable-capacitance diode D53 being electrically connected to the capacitor for varying band C4 and the cathode of the variable-capacitance diode D54 respectively, and the anode of the variable-capacitance diode D55 being grounded.

The antenna-duplexer 51 of the above constitution achieves the same effects as the antenna-duplexer 1 of the first embodiment. Resistors may be used instead of the choke coils L2, L3, L6–8, and the circuits on the voltage control terminals CONT1 and 2 sides may be high-impedance resistors. In such a case, the resistors for control voltage supply R1 and R2 can be omitted.

Figure 6:
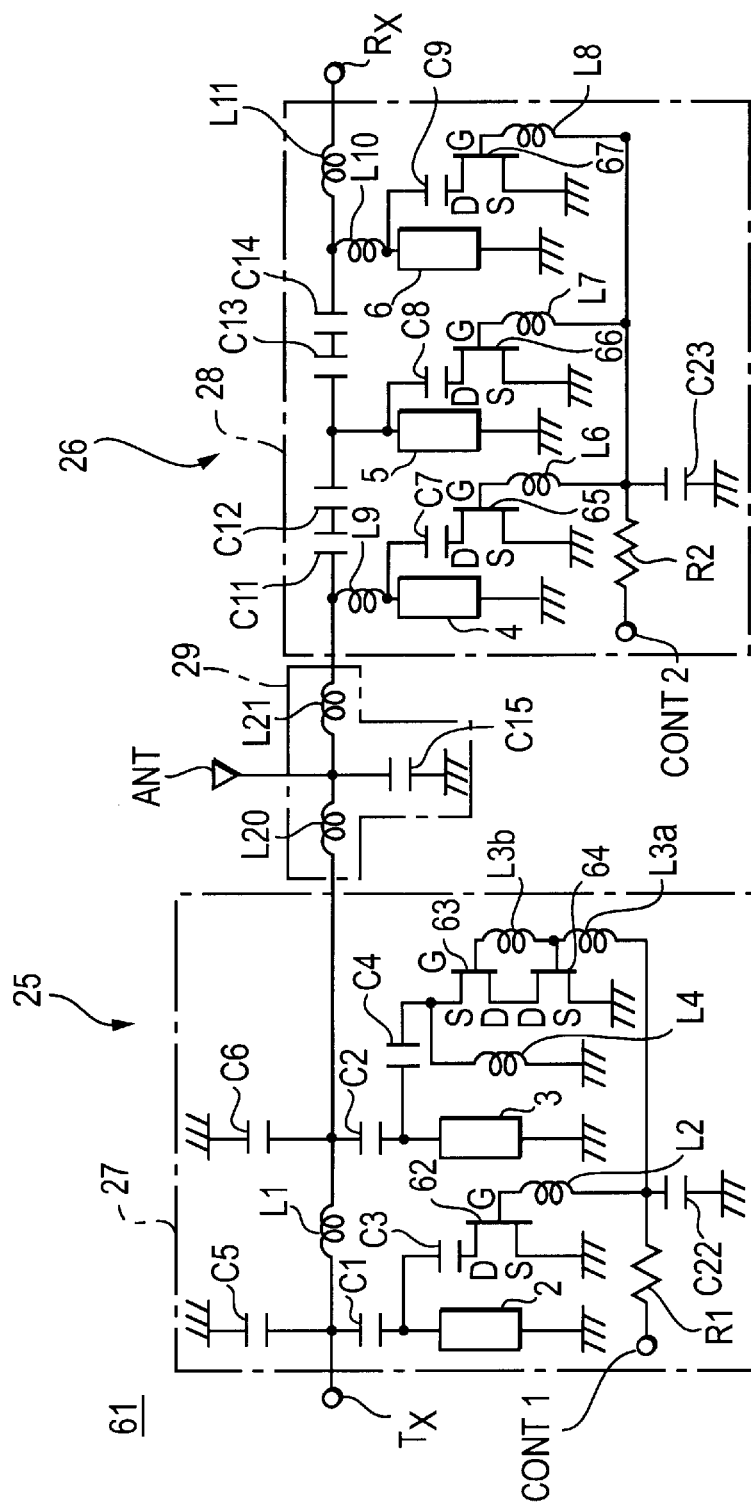
FIG. 6 is an electrical circuit diagram showing a fourth preferred embodiment of an antenna-duplexer according to the present invention.

FIG. 6 shows an electrical circuit of a fourth preferred embodiment of the antenna-duplexer according to the present invention. The antenna-duplexer 61 uses field-effect transistors (FET) 62–67 as its voltage-controllable impedance elements. The sources S of the FETs 62, 65, 66 and 67 are grounded, their drains D are electrically connected via the capacitors for varying band C3, C7, C8 and C9 to the resonators 2, 4, 5 and 6, and their gates G are electrically connected via choke coils L2, L6, L7 and L8 or the like to the voltage control terminals CONT1 and 2.

The two FETs 63 and 64 are connected in series, the source S and the drain D of the FET 63 being electrically connected to the capacitor for varying band C4 and the drain D of the FET 64, and the source S of the FET 64 is grounded. The gates G of the FETs 63 and 64 are electrically connected via choke coils L3a and L3b and the like to the voltage control terminal CONT1.

The antenna-duplexer 61 of the above constitution achieves the same effects as the antenna-duplexer 1 of the first preferred embodiment. Resistors may be used instead of the choke coils L2, L3a, L6–8, and the circuits on the voltage control terminals CONT1 and 2 sides may be high-impedance resistors. In such a case, the resistors for control voltage supply R1 and R2 can be omitted.

Figure 7:
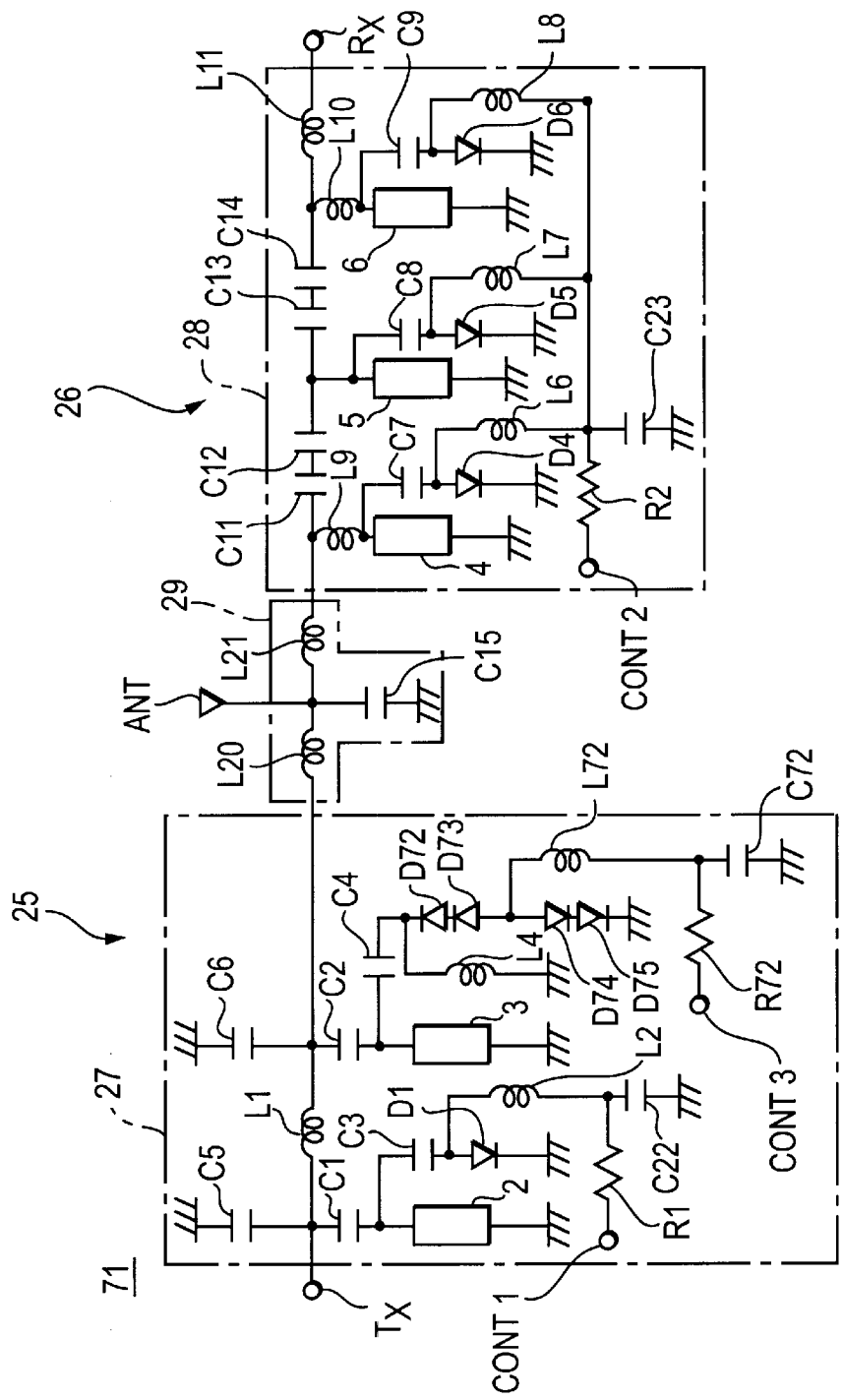
FIG. 7 is an electrical circuit diagram showing a fifth preferred embodiment of an antenna-duplexer according to the present invention.

FIG. 7 shows an electrical circuit of a fifth preferred embodiment of the antenna-duplexer according to the present invention. The antenna-duplexer 71 is the same as the antenna-duplexer 1 of the first embodiment, except that PIN diodes D72, D73, D74 and D75 are electrically connected in series to the resonator 3, this being the resonator of the transmission side circuit 25 which is electrically connected closest to the antenna terminal ANT.

The PIN diodes D72 and D73 are given directivity and connected in series, the cathode of the PIN diode D72 being electrically connected to the capacitor for varying band C4, and the anode of the PIN diode D73 being electrically connected to the anode of the PIN diode D74. The PIN diodes D74 and D75 are also given directivity and connected in series, the cathode of the PIN diode D72 being grounded. At a connection point midway between the anodes of the PIN diodes D73 and D74, the voltage control terminal CONT3 is electrically connected via a resistor for control voltage supply R72 and a capacitor 72 and a choke coil L72.

With the above constitution, the high-frequency voltage of the transmission waves is divided by the four PIN diodes D72–D75, connected in series, so that the voltage applied to each PIN diode is less than in the antenna-duplexer 1 of the first embodiment. As a result, it is possible to further reduce relative modulation distortion of the transmission wave F1 and the wave F2 intruding from the antenna terminal ANT.

The sixth preferred embodiment describes a communication apparatus according to the present invention, explained using a mobile telephone as an example.

Figure 8:
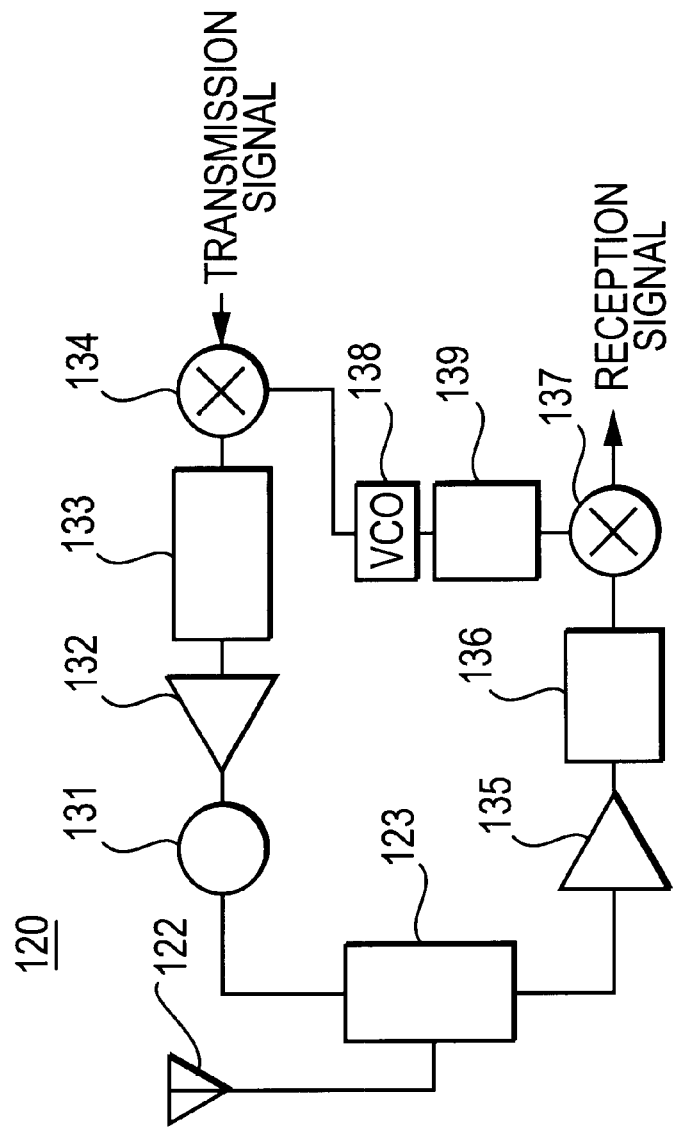
FIG. 8 is a block diagram showing an preferred embodiment of a communication apparatus according to the present invention.

FIG. 8 is a electrical circuit block diagram of an RF portion of a mobile telephone 120. In FIG. 8, 122 is an antenna element, 123 is an antenna-duplexer, 131 is a transmission side isolator, 132 is a transmission side amplifier, 133 is a bandpass filter for transmission side section, 134 is a transmission side mixer, 135 is a receive side amplifier, 136 is a bandpass filter for receive side section, 137 is a receive side mixer, 138 is a voltage-controlled oscillator (VCO) and 39 is a local bandpass filter.

Here, any of the antenna-duplexers 1, 41, 51, 61 and 71 of the embodiments 1 to 5 can be used as the antenna-duplexer 123. By mounting one of the antenna-duplexers 1, 41, 51, 61 and 71, it is possible to realize a mobile telephone with reduced relative modulation distortion between transmitted waves and waves intruding from the antenna terminal The antenna-duplexer and communication apparatus of the present invention are not limited to the embodiments described above, and can be modified within the scope of its main points.

As is clear from the above description, according to the present invention, high-frequency voltage can be divided by multiple in-series impedance elements, which are connected to the resonator of the transmission side circuit which is electrically connected closest to the antenna terminal, and it is possible to effectively reduce the relative modulation distortion, produced by the transmission waves and intrusive waves, entering from the antenna terminal. Furthermore, by using these antenna-duplexers, the electrical characteristics of a communication apparatus can be improved.

While the invention has been particularly shown and described with reference to preferred embodiments thereof, it will be understood by those skilled in the art that the forgoing and other changes in form and details may be made therein without departing from the spirit of the invention.

What is claimed is:

1. An antenna-duplexer, comprising:

a transmission terminal, a reception terminal and an antenna terminal;

a transmission side circuit, electrically connected between said transmission terminal and said antenna terminal, and comprising at least one first resonator and a first voltage-controllable impedance element which is electrically connected between said first resonator and ground via either a first inductance or a first capacitor; and a reception side circuit, electrically connected between said reception terminal and said antenna terminal, and comprising at least one second resonator and a second voltage-controllable impedance element which is electrically connected between said second resonator and ground via either a second inductance or a second capacitor;

a plurality of said first voltage controllable impedance elements being connected in series to said first resonator of said transmission side circuit which is electrically connected closest to said antenna terminal.

2. The antenna-duplexer according to claim 1, wherein two of said first voltage controllable impedance elements are connected in series to a resonator of said transmission side circuit which is electrically connected closest to said antenna terminal.

3. The antenna-duplexer according to claim 2, wherein said first voltage-controllable impedance elements are PIN diodes, and, of the two PIN diodes which are connected in series to said first resonator of said transmission side circuit which is electrically connected closest to said antenna terminal, a cathode of a first PIN diode is electrically connected to either said first inductance or said first capacitor, a cathode of a second PIN diode is electrically connected to ground, and an anode of said first PIN diode and an anode of said second PIN diode are electrically connected to a voltage control terminal.

4. The antenna-duplexer according to claim 2, wherein said first voltage-controllable impedance elements are variable-capacitance diodes, and, of the two variable-capacitance diodes which are connected in series to said first resonator of said transmission side circuit which is electrically connected closest to said antenna terminal, a cathode of a first variable-capacitance diode is electrically connected to either said first inductance or said first capacitor, a cathode of a second variable-capacitance diode is electrically connected to ground, and an anode of said first variable-capacitance diode and an anode of said second variable-capacitance diode are electrically connected to a voltage control terminal.

5. The antenna-duplexer according to claim 2, wherein said first voltage-controllable impedance elements are field effect transistors, and, of the two field effect transistors which are connected in series to said first resonator of said transmission side circuit which is electrically connected closest to said antenna terminal, a source of a first field effect transistor is electrically connected to either said first inductance or said first capacitor, a source of a second field effect transistor is electrically connected to ground, drains of said first and second field effect transistors are electrically connected together, and gates of said first and second field effect transistors are electrically connected to a shared voltage control terminal.

6. The antenna-duplexer according to claim 1, wherein at least one of said first and second resonators is a dielectric resonator.

7. The antenna-duplexer according to claim 2, wherein at least one of said first and second resonators is a dielectric resonator.

8. The antenna-duplexer according to claim 3, wherein at least one of said first and second resonators is a dielectric resonator.

9. The antenna-duplexer according to claim 4, wherein at least one of said first and second resonators is a dielectric resonator.

10. The antenna-duplexer according to claim 5, wherein at least one of said first and second resonators is a dielectric resonator.

11. A communication apparatus comprising the antenna duplexer of claim 1, a transmission circuit connected to said transmission terminal, and a reception circuit connected to said reception terminal.

12. A communication apparatus comprising the antenna duplexer of claim 2, a transmission circuit connected to said transmission terminal, and a reception circuit connected to said reception terminal.

13. A communication apparatus comprising the antenna duplexer of claim 3, a transmission circuit connected to said transmission terminal, and a reception circuit connected to said reception terminal.

14. A communication apparatus comprising the antenna duplexer of claim 4, a transmission circuit connected to said transmission terminal, and a reception circuit connected to said reception terminal.

15. A communication apparatus comprising the antenna duplexer of claim 5, a transmission circuit connected to said transmission terminal, and a reception circuit connected to said reception terminal.

16. A communication apparatus comprising the antenna duplexer of claim 6, a transmission circuit connected to said transmission terminal, and a reception circuit connected to said reception terminal.

17. A communication apparatus comprising the antenna duplexer of claim 7, a transmission circuit connected to said transmission terminal, and a reception circuit connected to said reception terminal.

18. A communication apparatus comprising the antenna duplexer of claim 8, a transmission circuit connected to said transmission terminal, and a reception circuit connected to said reception terminal.

19. A communication apparatus comprising the antenna duplexer of claim 9, a transmission circuit connected to said transmission terminal, and a reception circuit connected to said reception terminal.

20. A communication apparatus comprising the antenna duplexer of claim 10, a transmission circuit connected to said transmission terminal, and a reception circuit connected to said reception terminal.

* * * * *